United States Patent
Kung et al.

(10) Patent No.: US 10,230,259 B2
(45) Date of Patent: *Mar. 12, 2019

(54) APPARATUS FOR PERFORMING HYBRID POWER CONTROL IN AN ELECTRONIC DEVICE WITH AID OF MULTIPLE SWITCHES CORRESPONDING MULTI-PURPOSE USAGE

(71) Applicant: MEDIATEK INC., Hsin-Chu (TW)

(72) Inventors: Nien-Hui Kung, Hsinchu (TW); Chien-Wei Kuan, Hsinchu (TW); Yen-Hsun Hsu, Hsinchu County (TW)

(73) Assignee: MEDIATEK INC., Hsin-Chu (TW)

( * ) Notice: Subject to any disclaimer, the term of this patent is extended or adjusted under 35 U.S.C. 154(b) by 357 days.

This patent is subject to a terminal disclaimer.

(21) Appl. No.: 15/158,567

(22) Filed: May 18, 2016

(65) Prior Publication Data

US 2016/0268836 A1 Sep. 15, 2016

Related U.S. Application Data

(63) Continuation-in-part of application No. 14/922,192, filed on Oct. 25, 2015, now Pat. No. 9,825,480, which is a continuation-in-part of application No. 14/738,947, filed on Jun. 15, 2015, now Pat. No. 9,731,613.

(Continued)

(51) Int. Cl.
*H02J 7/04* (2006.01)
*H02J 7/00* (2006.01)
(Continued)

(52) U.S. Cl.
CPC ........... *H02J 7/045* (2013.01); *B60L 11/1824* (2013.01); *B60L 11/1851* (2013.01);
(Continued)

(58) Field of Classification Search
CPC .................................................. B60L 11/1824
(Continued)

(56) References Cited

U.S. PATENT DOCUMENTS 9,237,211 B2 1/2016 Tabe
2005/0189916 A1 9/2005 Bucur
(Continued)

FOREIGN PATENT DOCUMENTS

CN 102170160 A 8/2011
CN 203504264 U 3/2014
(Continued)

OTHER PUBLICATIONS

Texas Instruments, bq2416xx 2.5A, Dual-Input, Single-Cell Switched-Mode Li-Ion Battery Charger with Power Path Management and I2C Interface, bq24160, bq24160A, bq24161, bq24161B, bq24163, bq24168, Nov. 2011, XP055284945.

*Primary Examiner* — Edward Tso
*Assistant Examiner* — Ahmed Omar
(74) *Attorney, Agent, or Firm* — Winston Hsu (57) ABSTRACT

An apparatus for performing hybrid power control in an electronic device includes a charger positioned in the electronic device, and the charger is arranged for selectively charging a battery of the electronic device. In addition, at least one portion of the charger is implemented within a charger chip. For example, the charger may include: a plurality of terminals that are positioned on the charger chip, where the plurality of terminals may include a third terminal and a fourth terminal; a plurality of switching units, positioned on the charger chip; and a control circuit, positioned on the charger chip and coupled to the plurality of switching units. The third terminal and the fourth terminal may be arranged for installing an inductor, where the inductor may be utilized by the charger when the control circuit configures the charger into any of at least two hardware configurations within a plurality of hardware configurations.

20 Claims, 10 Drawing Sheets

Related U.S. Application Data (60) Provisional application No. 62/270,071, filed on Dec. 21, 2015, provisional application No. 62/115,121, filed on Feb. 11, 2015.

(51) Int. Cl.
*B60L 11/18* (2006.01)
*H02M 3/156* (2006.01)
*H02M 3/158* (2006.01)
*H02J 7/02* (2016.01)
*H05B 33/08* (2006.01)

(52) U.S. Cl.
CPC ............ *H02J 7/0068* (2013.01); *H02J 7/022* (2013.01); *H02J 7/04* (2013.01); *H02M 3/156* (2013.01); *H02M 3/1584* (2013.01); *H05B 33/0815* (2013.01); *Y02B 20/346* (2013.01); *Y02T 90/127* (2013.01)

(58) Field of Classification Search
USPC .................................................. 320/128, 137
See application file for complete search history.

(56) References Cited

U.S. PATENT DOCUMENTS

| | | |
|---|---|---|
| 2008/0265839 A1 | 10/2008 | Yang |
| 2011/0234151 A1 | 9/2011 | Uan-Zo-Li |
| 2014/0062435 A1 | 3/2014 | Lu |
| 2015/0035477 A1 | 2/2015 | Wong |
| 2015/0364997 A1 | 12/2015 | Deng |
| 2016/0064986 A1 | 3/2016 | Langlinais |
| 2016/0087462 A1 | 3/2016 | Kudo |

FOREIGN PATENT DOCUMENTS

| | | |
|---|---|---|
| CN | 104009529 A | 8/2014 |
| EP | 1 919 058 A2 | 5/2008 |

APPARATUS FOR PERFORMING HYBRID POWER CONTROL IN AN ELECTRONIC DEVICE WITH AID OF MULTIPLE SWITCHES CORRESPONDING MULTI-PURPOSE USAGE

CROSS REFERENCE TO RELATED APPLICATION

This application claims the benefit of U.S. Provisional Application No. 62/270,071, which was filed on Dec. 21, 2015, and is included herein by reference. In addition, this application is a continuation-in-part application and claims the benefit of U.S. Non-provisional application Ser. No. 14/922,192, which was filed on Oct. 25, 2015, and is included herein by reference. The U.S. Non-provisional application Ser. No. 14/922,192 claims the benefit of U.S. Provisional Application No. 62/115,121 (which was filed on Feb. 11, 2015), and is a continuation-in-part application and claims the benefit of U.S. Non-provisional application Ser. No. 14/738,947 (which was filed on Jun. 15, 2015). Additionally, the U.S. Non-provisional application Ser. No. 14/738,947 claims the benefit of the U.S. Provisional Application No. 62/115,121 (which was filed on Feb. 11, 2015). All related applications are included herein by reference.

BACKGROUND

The present invention relates to charger control in a portable electronic device, and more particularly, to an apparatus for performing hybrid power control in an electronic device.

According to the related art, a conventional charger system may be implemented within a conventional multifunctional mobile phone for charging a battery thereof, and the conventional charger system may comprise an inductor for a certain purpose. Based on this conventional design, some problems may occur. For example, as the height of the inductor is typically limited by the thickness of the conventional multifunctional mobile phone, and as the inductance value of the inductor is typically proportional to the height of the inductor, there may be a tradeoff between the thickness of the conventional multifunctional mobile phone and the characteristic corresponding to the inductance value of the inductor. In addition, the inductor may occupy a significant volume of space within the conventional multifunctional mobile phone, and may be idle in a situation where the conventional charger system is not operating for the certain purpose. The volume occupied by this inductor seems to be wasted when the inductor is idle in this situation, since the volume occupied by this inductor can never be used by any other component in the lifetime of the conventional multifunctional mobile phone. Thus, a novel architecture is required for sharing components to allow multi-purpose usage, in order to increase the utilization rate of the components in the whole system.

SUMMARY

It is an objective of the claimed invention to provide an apparatus for performing hybrid power control in an electronic device, in order to solve the above-mentioned problems.

It is another objective of the claimed invention to provide an apparatus for performing hybrid power control in an electronic device, in order to share components to allow multi-purpose usage.

According to at least one preferred embodiment, an apparatus for performing hybrid power control in an electronic device is provided, where the apparatus may comprise at least one portion (e.g. a portion or all) of the electronic device. For example, the apparatus may comprise a charger that is positioned in the electronic device, and the charger may be arranged for selectively charging a battery of the electronic device, wherein at least one portion (e.g. a portion or all) of the charger may be implemented within a charger chip. More particularly, the charger may comprise: a first terminal, positioned on the charger chip; a second terminal, positioned on the charger chip (e.g. second terminal may be selectively coupled to the first terminal); a third terminal, positioned on the charger chip and selectively coupled to the second terminal; a fourth terminal, positioned on the charger chip; a plurality of switching units, positioned on the charger chip; and a control circuit, positioned on the charger chip and coupled to the plurality of switching units. For example, the first terminal may be arranged for coupling the charger to a power input port of the electronic device, wherein the power input port is utilized for selectively obtaining external power from outside the electronic device. The second terminal may be arranged for delivering the external power obtained through the first terminal to at least one internal component of the charger chip when needed, and the third terminal and the fourth terminal may be arranged for installing an inductor of the charger, wherein a first terminal of the inductor may be coupled to the third terminal, and a second terminal of the inductor may be coupled to the fourth terminal. In addition, the plurality of switching units may be arranged for selectively enabling or disabling partial paths between components within the charger, wherein the plurality of switching units comprises a first switching unit coupled between the second terminal and the third terminal. Additionally, the control circuit may be arranged for controlling the plurality of switching units to configure the charger into one of a plurality of hardware configurations corresponding to multi-purpose usage of the charger, wherein the inductor may be utilized by the charger when the control circuit configures the charger into any of at least two hardware configurations within the plurality of hardware configurations.

It is an advantage of the present invention that the present invention apparatus can share one or more components (e.g. the inductor) to allow multi-purpose usage, in order to increase the utilization rate of the one or more components in the whole system. As a result, the related art problems are no longer an issue.

These and other objectives of the present invention will no doubt become obvious to those of ordinary skill in the art after reading the following detailed description of the preferred embodiment that is illustrated in the various figures and drawings.

DETAILED DESCRIPTION

Certain terms are used throughout the following description and claims, which refer to particular components. As one skilled in the art will appreciate, electronic equipment manufacturers may refer to a component by different names. This document does not intend to distinguish between components that differ in name but not in function. In the following description and in the claims, the terms "include" and "comprise" are used in an open-ended fashion, and thus should be interpreted to mean "include, but not limited to . . . ". Also, the term "couple" is intended to mean either an indirect or direct electrical connection. Accordingly, if one device is coupled to another device, that connection may be through a direct electrical connection, or through an indirect electrical connection via other devices and connections.

Figure 1:
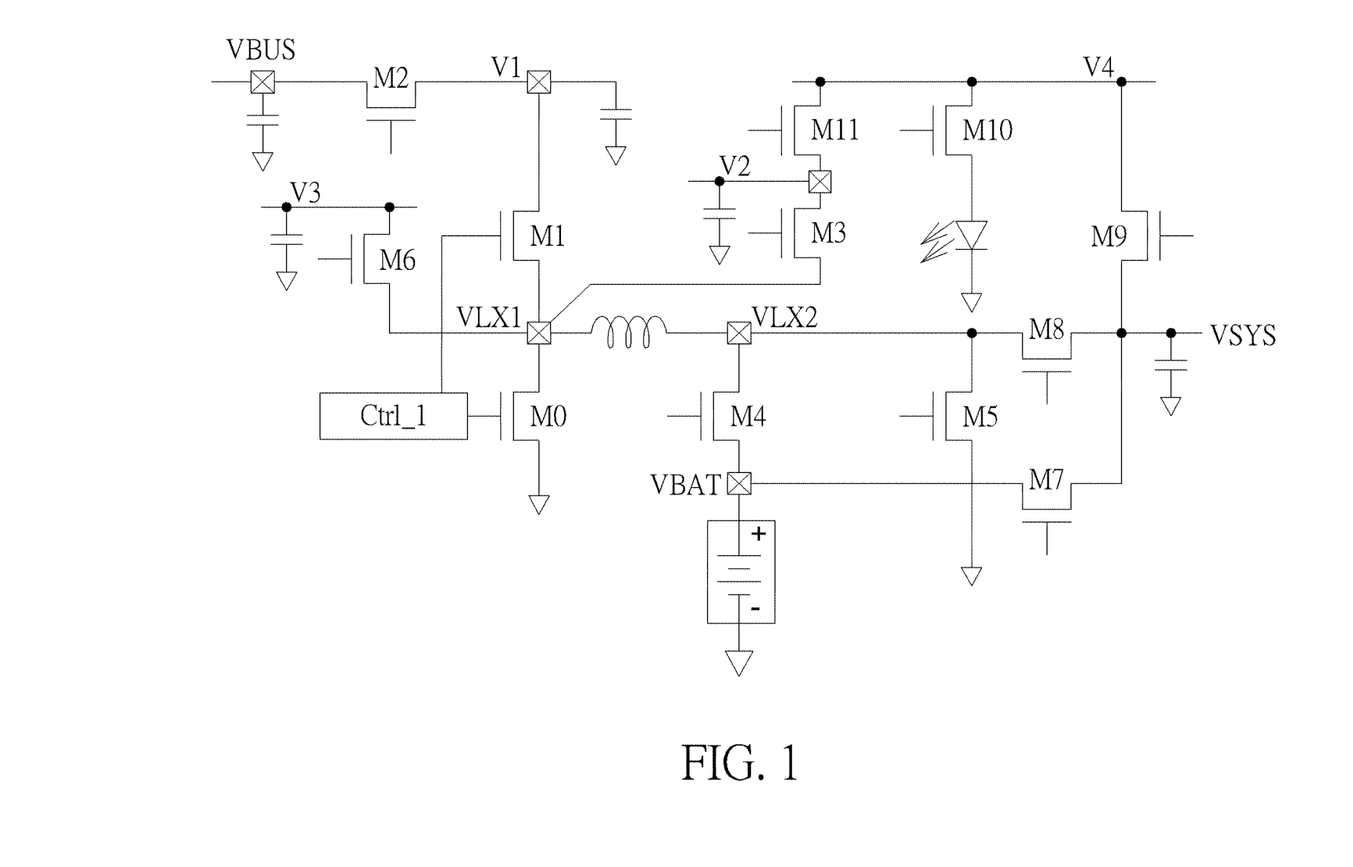
FIG. 1 is a diagram of an apparatus for performing hybrid power control in an electronic device according to an embodiment of the present invention.

FIG. 1 is a diagram of an apparatus for performing hybrid power control in an electronic device according to an embodiment of the present invention, where the apparatus may comprise at least one portion of the electronic device. For example, the apparatus may comprise a portion of the electronic device mentioned above, and more particularly, can be at least one hardware circuit such as at least one integrated circuit (IC) within the electronic device and associated circuits thereof. In another example, the apparatus can be the whole of the electronic device mentioned above. In another example, the apparatus may comprise a system comprising the electronic device mentioned above (e.g. a wireless communications system comprising the electronic device). Examples of the electronic device may include, but not limited to, a multifunctional mobile phone, a tablet, and a laptop computer.

According to this embodiment, the apparatus may comprise a charger that is positioned in the electronic device, and the charger may be arranged for selectively charging a battery of the electronic device (e.g. the battery shown below the terminal VBAT in FIG. 1), where at least one portion (e.g. a portion or all) of the charger may be implemented within a charger chip, which can be taken as an example of the IC. For better comprehension, the pad notation of a square labeled "X" therein can be utilized for representing a pad of the IC, such as an input/output (I/O) pad of the IC. As shown in FIG. 1, the charger may comprise: a first terminal (which may be the terminal VBUS such as a pad in one example, or may be a terminal next to the terminal VBUS, such as a pad electrically connected to the terminal VBUS, directly, in another example), positioned on the charger chip; a second terminal (e.g. the terminal V1 shown in FIG. 1, such as a pad), positioned on the charger chip and selectively coupled to the first terminal; a third terminal (e.g. the terminal VLX1 such as a pad), positioned on the charger chip and selectively coupled to the second terminal; and a fourth terminal (e.g. the terminal VLX2 such as a pad), positioned on the charger chip and coupled to the third terminal. Please note that the charger may comprise some other terminals that are positioned on the charger chip, such as the terminals VSYS and VBAT, where the terminal VSYS may be referred to as the system terminal, and the terminal VBAT may be referred to as the battery terminal. In addition, the charger may comprise a plurality of switching units that may be positioned on the charger chip, such as the switching units M0, M1, M2, M3, M4, M5, M6, M7, M8, M9, M10, and M11 shown in FIG. 1, and may further comprise a control circuit Ctrl_1 that may be positioned on the charger chip and coupled to the plurality of switching units. Examples of the plurality of switching units may include, but not limited to, Metal Oxide Semiconductor Field Effect Transistors (MOSFETs). According to some embodiments, in a situation where at least one portion (e.g. a portion or all) of switching units within the plurality of switching units are implemented with transistors (e.g. Field Effect Transistors (FETs) such as MOSFETs), each switching unit of the aforementioned at least one portion of switching units may be regarded as a switching circuit.

For better comprehension, the terminal VBUS may be regarded as a power input terminal, and the terminals VSYS and V4 may be regarded as power output terminals. For example, the first terminal (e.g. the terminal VBUS, or the aforementioned terminal next to the terminal VBUS) may be arranged for coupling the charger to a power input port of the electronic device, where the power input port is utilized for selectively obtaining external power from outside the electronic device, and the terminal VBUS can be a terminal of the power input port. In addition, the second terminal (e.g. the terminal V1) may be arranged for delivering the external power obtained through the first terminal and inputting the external power into at least one internal component of the charger chip when needed, and the third terminal (e.g. the terminal VLX1) and the fourth terminal (e.g. the terminal VLX2) may be arranged for installing an inductor of the charger, such as the inductor illustrated between the terminals VLX1 and VLX2 shown in FIG. 1, where a first terminal of the inductor may be coupled to the third terminal, and a second terminal of the inductor may be coupled to the fourth terminal. Additionally, the third terminal (e.g. the terminal VLX1) may be arranged for interconnecting partial paths between components within the charger, and may be utilized for selectively bypassing the external power when needed, and the fourth terminal (e.g. the terminal VLX2) may be arranged for interconnecting a battery path from the battery (e.g. a section of path below the terminal VLX2 in FIG. 1) and another partial path within the charger (e.g. a section of path at the left or the right of the terminal VLX2 in FIG. 1).

Based on the architecture shown in FIG. 1, the charger may comprise a first power output path that is coupled to the fourth terminal (e.g. the terminal VLX2), and may comprise a second power output path and a third power output path that are coupled to the third terminal (e.g. the terminal VLX1). For example, the first power output path may comprise at least one portion of the signal path from the terminal VLX2 toward the terminal VSYS shown in FIG. 1, such as a system power output path for driving a system (e.g. a main system circuit) of the electronic device. In addition, the second power output path may comprise at least one portion of the signal path from the terminal VLX1 toward the terminal V4 shown in FIG. 1, such as a flash path for driving a flash unit (e.g. a light emitting diode (LED) shown around the upper right of FIG. 1) of the electronic device, allowing the user of the electronic device to take photographs in poor light. Additionally, the third power output path may comprise at least one portion of the signal path from the terminal VLX1 toward the terminal V3 shown in FIG. 1. For example, the first power output path (e.g. the system power output path) may be arranged for providing a first voltage level (e.g. a voltage level VSYS corresponding to the terminal VSYS), the second power output path (e.g. the flash path) may be arranged for selectively providing a second voltage level (e.g. a voltage level V4 corresponding to the terminal V4), and the third power output path may be arranged for selectively providing a third voltage level (e.g. a voltage level V3 corresponding to the terminal V3), where the second voltage level may be greater than the first voltage level, and the third voltage level may be different from the first voltage level and may be different from the second voltage level.

According to this embodiment, the plurality of switching units such as those shown in FIG. 1 may be arranged for selectively enabling or disabling partial paths between components within the charger. For example, the switching unit M1 coupled between the terminals V1 and VLX1 may selectively enable or disable the signal path between the terminals V1 and VLX1. For another example, the switching unit M2 coupled between the terminals VBUS and V1 may selectively enable or disable the signal path between the terminals VBUS and V1. For yet another example, the switching unit M0 coupled between the terminal VLX1 and at least one ground terminal (e.g. one or more ground terminals) may selectively enable or disable the signal path between the terminal VLX1 and the aforementioned at least one ground terminal. In addition, the control circuit Ctrl_1 may be arranged for controlling the plurality of switching units to configure the charger into one of a plurality of hardware configurations corresponding to multi-purpose usage of the charger, where the inductor such as that between the terminals VLX1 and VLX2 may be utilized by the charger when the control circuit configures the charger into any of at least two hardware configurations within the plurality of hardware configurations. For example, the inductor is not kept idle when the control circuit Ctrl_1 configures the charger into any of the aforementioned at least two hardware configurations.

Please note that each hardware configuration within the plurality of hardware configurations may allow the charger to operate for at least one purpose (e.g. one or more purposes) within a plurality of purposes respectively corresponding to the plurality of hardware configurations. For example, a first hardware configuration within the plurality of hardware configurations may allow the charger to provide the first voltage level (e.g. the voltage level VSYS corresponding to the terminal VSYS) for a first purpose of the plurality of purposes. For another example, a second hardware configuration within the plurality of hardware configurations may allow the charger to provide the second voltage level (e.g. the voltage level V4 corresponding to the terminal V4) for a second purpose of the plurality of purposes. For yet another example, a third hardware configuration within the plurality of hardware configurations may allow the charger to provide the third voltage level (e.g. the voltage level V3 corresponding to the terminal V3) for a third purpose of the plurality of purposes. As a result, the present invention apparatus and the associated operational methods, such as that of the embodiment shown in FIG. 1 or that of any of the following embodiments, can share one or more components (e.g. the inductor) to allow multi-purpose usage, in order to increase the utilization rate of the one or more components in the whole system. As a result, the related art problems are no longer an issue.

According to some embodiments, the present invention apparatus may utilize the same inductor to achieve the multi-purpose usage mentioned above. Examples of the multi-purpose usage may include, but not limited to, charging, buck, boost, buck-boost, reverse boost (e.g. in a situation where the electronic device is designed to comply with Universal Serial Bus (USB) On-The-Go (OTG) specifications), torch LED (e.g. the driving thereof), and flash LED (e.g. the driving thereof). Taking the architecture shown in FIG. 1 as an example, in a situation where the battery is presented and the power such as the battery power may be ready and the system that is coupled to the terminal VSYS needs the power, multiple sets of switching units that are selected from the plurality of switching units may be utilized for at least one portion (e.g. a portion or all) of the plurality of purposes respectively corresponding to the plurality of hardware configurations. For the multi-purpose usage of charging, the control circuit Ctrl_1 may control switching operations of a set of switching units {M0, M1, M2, M4, M8}, so the charger is indeed utilized as a charger. For the multi-purpose usage of reverse boost (e.g. for USB OTG), the control circuit Ctrl_1 may control switching operations of a set of switching units {M0, M1, M2, M4, M7}, so the charger may be utilized as a reverse boost circuit. For the multi-purpose usage of boost, the control circuit Ctrl_1 may control switching operations of a set of switching units {M0, M3, M4, M7}, so the charger may be utilized as a boost circuit. For the multi-purpose usage of buck-boost, the control circuit Ctrl_1 may control switching operations of a set of switching units {M0, M4, M5, M6, M7}, so the charger may be utilized as a buck-boost circuit. For the multi-purpose usage of buck, the control circuit Ctrl_1 may control switching operations of a set of switching units {M4, M5, M6, M7}, so the charger may be utilized as a buck circuit. For the multi-purpose usage of torch LED, the control circuit Ctrl_1 may control switching operations of a set of switching units {M7, M9, M10}, so the charger may be utilized as a torch LED driving circuit. For the multi-purpose usage of flash LED, the control circuit Ctrl_1 may control switching operations of a set of switching units {M0, M3, M4, M11, M10}, so the charger may be utilized as a flash LED driving circuit. For example, please refer to U.S. Non-provisional application Ser. No. 14/922,192 (which was filed on Oct. 25, 2015) for some implementation details of the switching operations regarding the multi-purpose usage of charging, torch LED, flash LED, etc.

Figure 2:
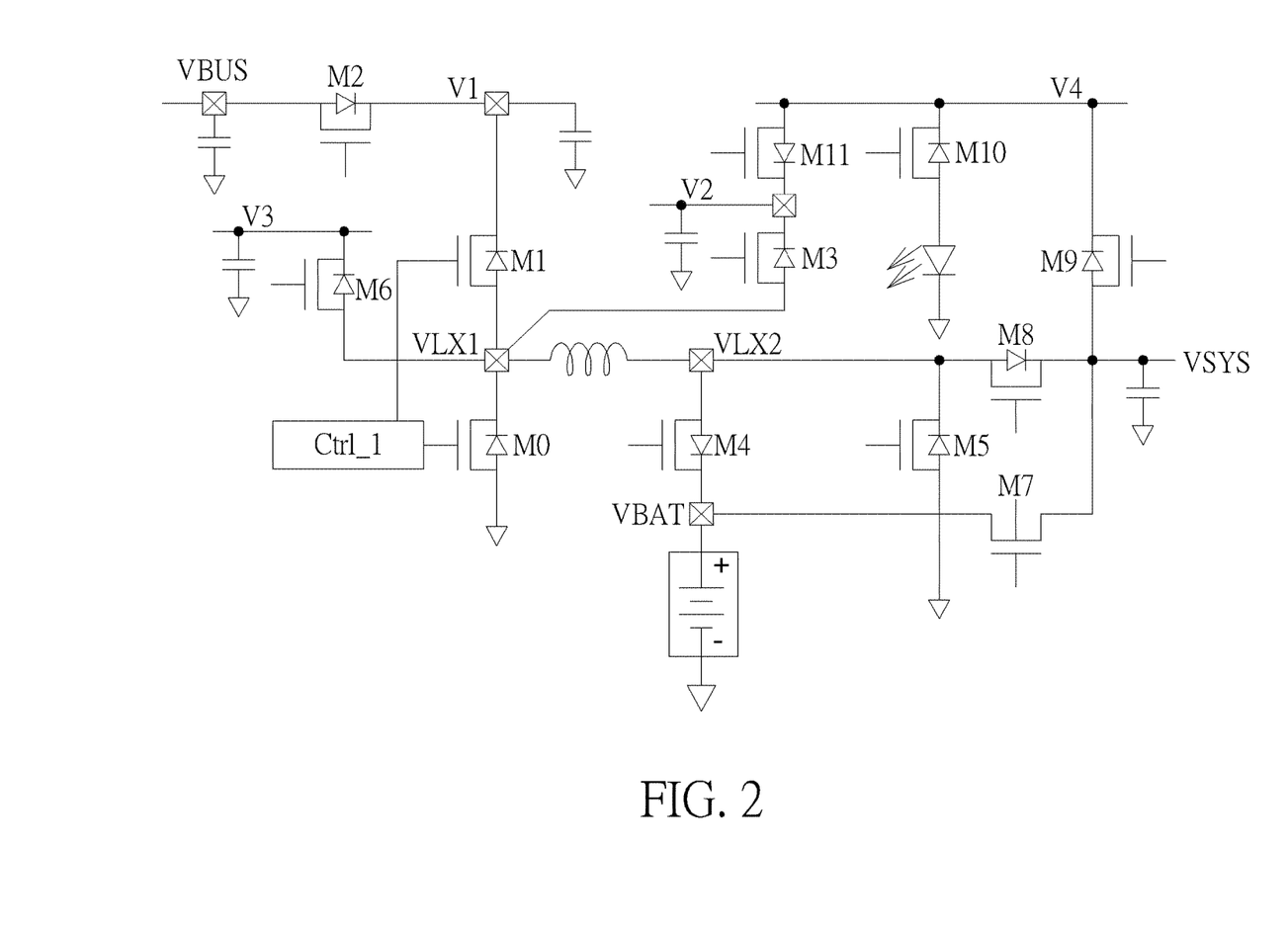
FIG. 2 illustrates some implementation details of the apparatus shown in FIG. 1 according to an embodiment of the present invention.

FIG. 2 illustrates some implementation details of the apparatus shown in FIG. 1 according to an embodiment of the present invention. For example, the plurality of switching units can be implemented with MOSFETs, and some of these MOSFETs may be installed to have the body diode directions shown in FIG. 2, respectively. For the switching unit M7 such as a MOSFET, the body terminal thereof may be coupled to a predetermined terminal or a predetermined voltage level associated to this MOSFET when needed. For brevity, similar descriptions for this embodiment are not repeated in detail here.

Figure 3:
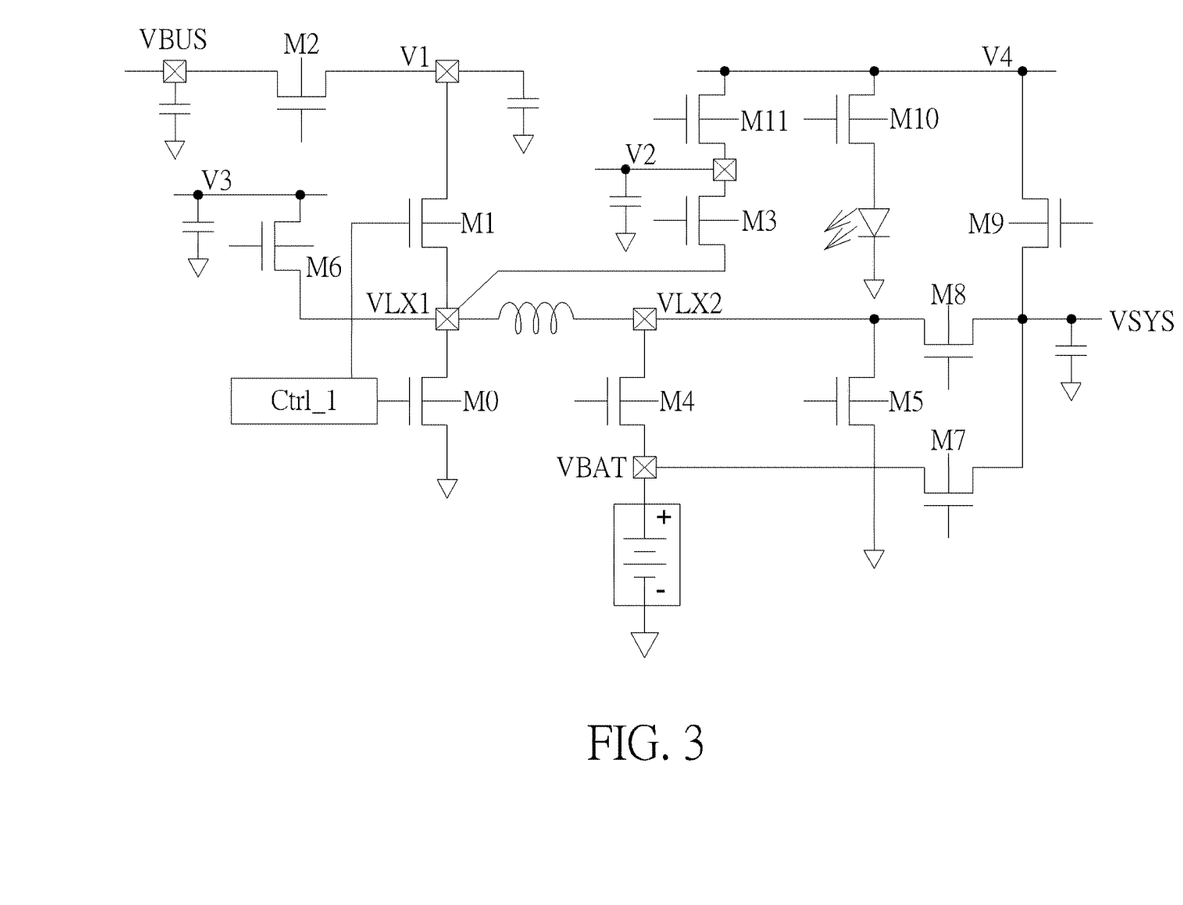
FIG. 3 illustrates some implementation details of the apparatus shown in FIG. 1 according to another embodiment of the present invention.

FIG. 3 illustrates some implementation details of the apparatus shown in FIG. 1 according to another embodiment of the present invention. For example, the plurality of switching units can be implemented with MOSFETs, and the body terminal of any MOSFET of these MOSFETs (e.g. each of these MOSFETs) may be coupled to a predetermined terminal or a predetermined voltage level associated to this MOSFET when needed. For brevity, similar descriptions for this embodiment are not repeated in detail here.

Figure 4:
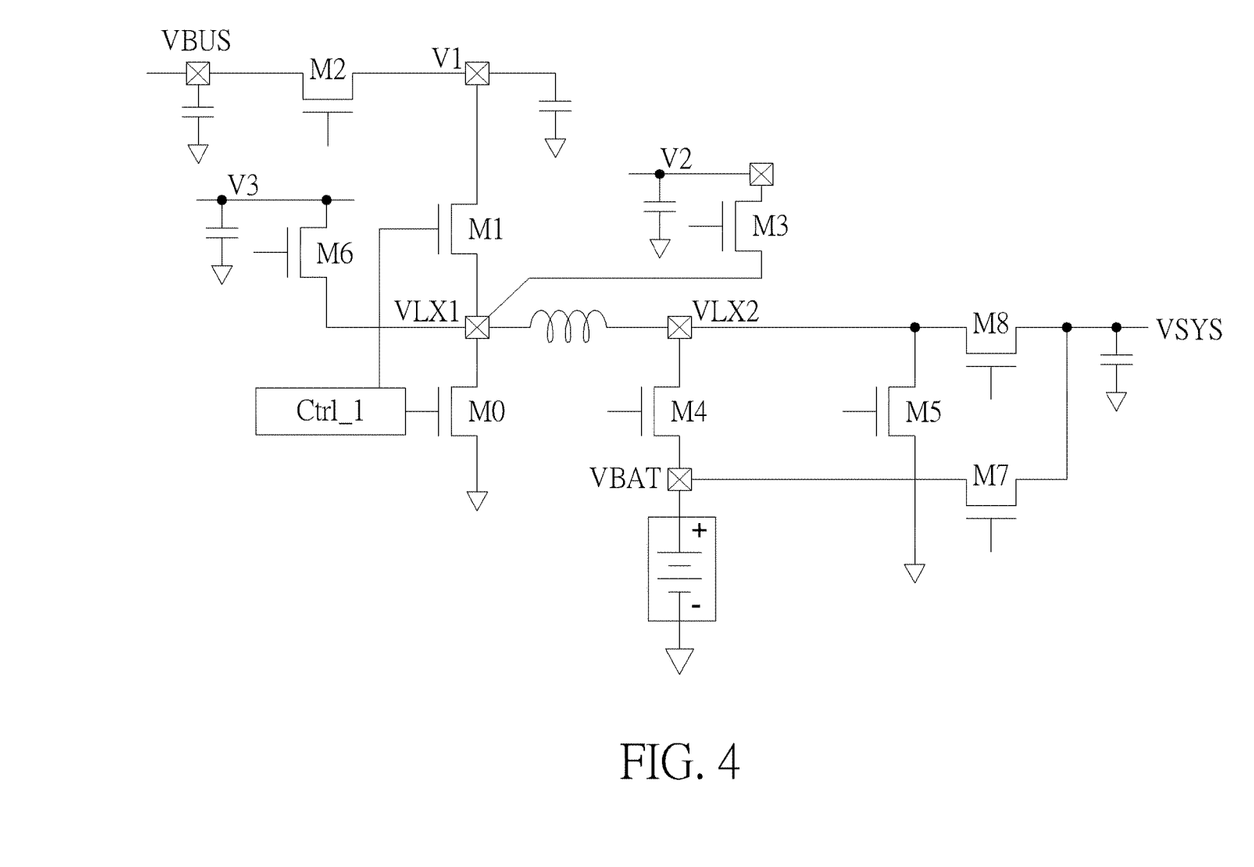
FIG. 4 is a diagram of an apparatus for performing hybrid power control in an electronic device according to another embodiment of the present invention.

FIG. 4 is a diagram of an apparatus for performing hybrid power control in an electronic device according to another embodiment of the present invention, where the terminal VBUS may be regarded as a power input terminal, and the terminals VSYS, V2, and V3 may be regarded as power output terminals. In comparison with the apparatus shown in FIG. 1, some components and the associated wirings are changed in this embodiment. For example, the flash related components (e.g. the switching units M9, M10, and M11 and the LED that are shown around the upper right of FIG. 1) may be removed in this embodiment. As a result, the second power output path of the embodiment shown in FIG. 1 becomes shorter in this embodiment. In addition, the plurality of switching units of the embodiment shown in FIG. 4 may comprise the switching units M0, M1, M2, M3, M4, M5, M6, M7, and M8.

According to this embodiment, examples of the multi-purpose usage may include, but not limited to, charging, buck, boost, buck-boost, reverse boost (e.g. in a situation where the electronic device is designed to comply with USB OTG specifications), and power path. For brevity, similar descriptions for this embodiment are not repeated in detail here.

According to another embodiment, the switching unit M3 may be removed from the architecture shown in FIG. 4, and the component and the associated wirings for providing the voltage level V3 corresponding to the terminal V3 (e.g. the capacitor next to the terminal V3 and the power line for providing the voltage level V3) may also be removed from the architecture shown in FIG. 4. In addition, examples of the multi-purpose usage may include, but not limited to, charging, buck, buck-boost, reverse boost (e.g. in a situation where the electronic device is designed to comply with USB OTG specifications), and power path. For brevity, similar descriptions for this embodiment are not repeated in detail here.

According to another embodiment, the switching units M3, M7, and M8 may be removed from the architecture shown in FIG. 4, and the component and the associated wirings for providing the voltage level V3 corresponding to the terminal V3 (e.g. the capacitor next to the terminal V3 and the power line for providing the voltage level V3) may also be removed from the architecture shown in FIG. 4, where the switching unit M8 may be replaced by a direct connection. As a result, the terminal VSYS is directly connected to the terminal VLX2, and there is no direct connection between the terminals VSYS and VBAT. In addition, examples of the multi-purpose usage may include, but not limited to, charging, boost, buck-boost, and reverse boost (e.g. in a situation where the electronic device is designed to comply with USB OTG specifications). For brevity, similar descriptions for this embodiment are not repeated in detail here.

According to another embodiment, the switching units M3, M6, M7, and M8 may be removed from the architecture shown in FIG. 4, and the component and the associated wirings for providing the voltage level V3 corresponding to the terminal V3 (e.g. the capacitor next to the terminal V3 and the power line for providing the voltage level V3) and the component and the associated wirings for providing the voltage level V2 corresponding to the terminal V2 (e.g. the capacitor next to the terminal V2 and the power line for providing the voltage level V2) may also be removed from the architecture shown in FIG. 4, where the switching unit M8 may be replaced by a direct connection. As a result, the terminal VSYS is directly connected to the terminal VLX2, and there is no direct connection between the terminals VSYS and VBAT. In addition, examples of the multi-purpose usage may include, but not limited to, charging, boost, buck-boost, and reverse boost (e.g. in a situation where the electronic device is designed to comply with USB OTG specifications). For brevity, similar descriptions for this embodiment are not repeated in detail here.

Figure 5:
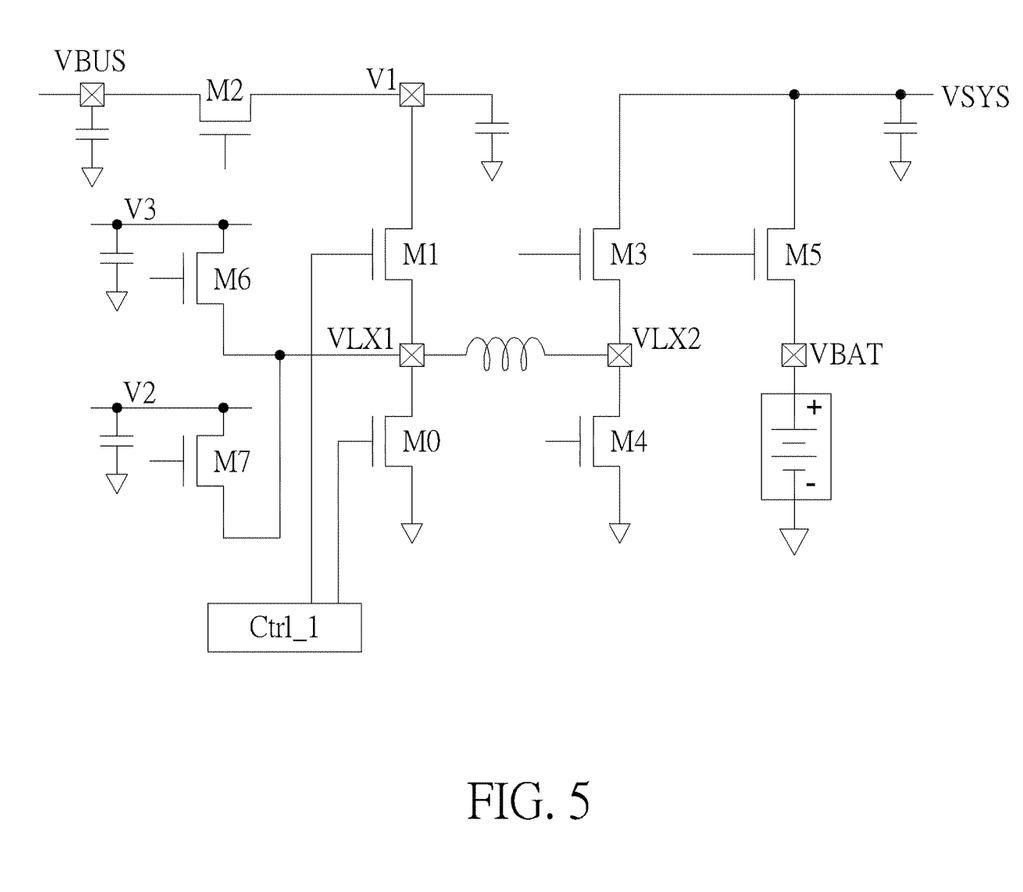
FIG. 5 is a diagram of an apparatus for performing hybrid power control in an electronic device according to another embodiment of the present invention.

FIG. 5 is a diagram of an apparatus for performing hybrid power control in an electronic device according to another embodiment of the present invention, where the terminal VBUS may be regarded as a power input terminal, and the terminals VSYS, V2, and V3 may be regarded as power output terminals. In comparison with the apparatus shown in FIG. 4, some components and the associated wirings are changed in this embodiment. For example, the power output path that passes through the terminal VLX2 and reaches the terminal VSYS in the embodiment shown in FIG. 4 is change to be that shown in the right half of FIG. 5, where the power output path for providing the voltage level V2 corresponding to the terminal V2 is change to be that shown around the lower left of FIG. 5. In addition, the plurality of switching units of the embodiment shown in FIG. 5 may comprise the switching units M0, M1, M2, M3, M4, M5, M6, and M7. For example, in a situation where the battery is presented and the power such as the battery power may be ready and the system that is coupled to the terminal VSYS needs the power, multiple sets of switching units that are selected from the plurality of switching units may be utilized for at least one portion (e.g. a portion or all) of the plurality of purposes respectively corresponding to the plurality of hardware configurations. For the multi-purpose usage of charging, the control circuit Ctrl_1 may control switching operations of a set of switching units {M0, M1, M2, M3, M5}, so the charger is indeed utilized as a charger. For the multi-purpose usage of reverse boost (e.g. for USB OTG), the control circuit Ctrl_1 may control switching operations of a set of switching units {M0, M1, M2, M3, M5}, so the charger may be utilized as a reverse boost circuit. For the multi-purpose usage of boost, the control circuit Ctrl_1 may control switching operations of a set of switching units {M0, M3, M5, M6}, so the charger may be utilized as a boost circuit. For the multi-purpose usage of buck-boost, the control circuit Ctrl_1 may control switching operations of a set of switching units {M0, M3, M4, M5, M7}, so the charger may be utilized as a buck-boost circuit. For the multi-purpose usage of buck, the control circuit Ctrl_1 may control switching operations of a set of switching units {M3, M4, M5, M6}, so the charger may be utilized as a buck circuit. For the multi-purpose usage of torch LED, the control circuit Ctrl_1 may control switching operations of a set of switching units {M0, M3, M5, M6}, so the charger may be utilized as a torch LED driving circuit. For the multi-purpose usage of flash LED, the control circuit Ctrl_1 may control switching operations of a set of switching units {M0, M3, M5, M6}, so the charger may be utilized as a flash LED driving circuit. For example, please refer to U.S. Non-provisional application Ser. No. 14/922,192 (which was filed on Oct. 25, 2015) for some implementation details of the switching operations regarding the multi-purpose usage of charging, torch LED, flash LED, etc. For brevity, similar descriptions for this embodiment are not repeated in detail here.

In comparison with the apparatus shown in FIG. 1 or the apparatus shown in FIG. 4, for example, in a situation where the plurality of switching units are implemented with MOSFETs, the MOSFET quantity of this embodiment can be lower than that of any of the embodiments respectively shown in FIGS. 1 and 4. As a result of changing the requirement of the MOSFET quantity, implementing the electronic device according to this embodiment may save the associated costs, where the charging efficiency of this embodiment may be poorer.

Figure 6:
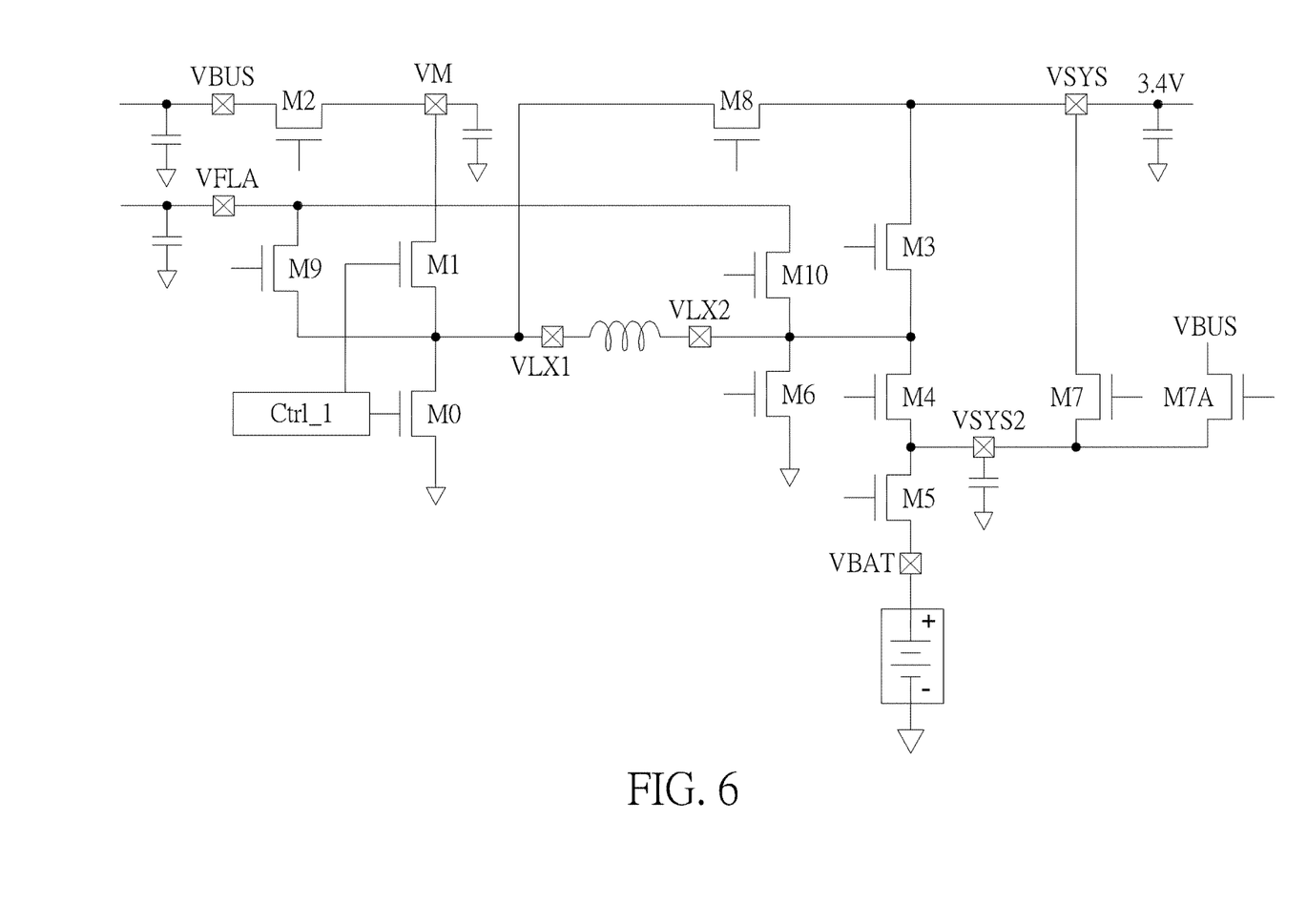
FIG. 6 is a diagram of an apparatus for performing hybrid power control in an electronic device according to another embodiment of the present invention.

FIG. 6 is a diagram of an apparatus for performing hybrid power control in an electronic device according to another embodiment of the present invention, where the terminal VBUS may be regarded as a power input terminal, and the terminals VSYS, VSYS2, and VFLA may be regarded as power output terminals. In comparison with the apparatus shown in FIG. 1, some components and the associated wirings are changed in this embodiment. For example, the plurality of switching units of the embodiment shown in FIG. 6 may comprise the switching units M0, M1, M2, M3, M4, M5, M6, M7, M7A, M8, M9, and M10. Please note that the switching circuit M5 may be arranged for performing power path management on the power path of the battery, such as that passing through the terminal VBAT. In addition, the switching circuit M7 may be arranged for preventing VBUS-plug-out induced VSYS crash (i.e. the crash of the voltage level VSYS corresponding to the terminal VSYS induced by plugging out the power source of the voltage level VBUS corresponding to the terminal VBUS). Additionally, the switching circuit M7A may be arranged for performing poor VBUS management, so that charging and providing the voltage level VSYS corresponding to the terminal VSYS can be covered together. For brevity, similar descriptions for this embodiment are not repeated in detail here.

According to another embodiment, the switching circuit M7 in the architecture shown in FIG. 6 can be replaced by the switching circuit M3 with at least one complex controller. For brevity, similar descriptions for this embodiment are not repeated in detail here.

Figure 7:
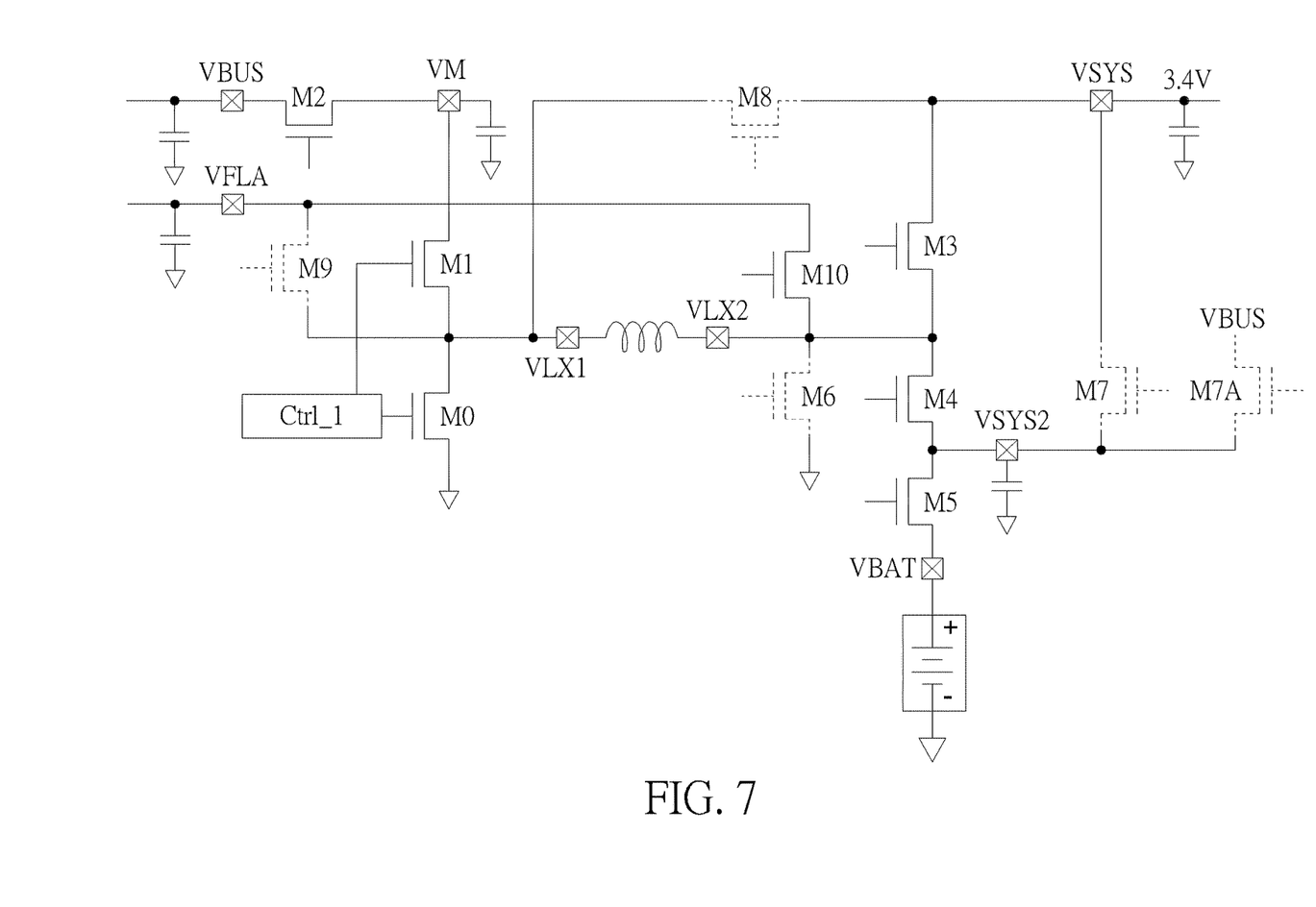
FIG. 7 illustrates a first configuration of the apparatus shown in FIG. 6 according to an embodiment of the present invention.

FIG. 7 illustrates a first configuration of the apparatus shown in FIG. 6 according to an embodiment of the present invention, where the switching circuits that are illustrated with dashed lines (e.g. the switching circuits M6, M7, M7A, M8, and M9) may be temporarily turned off. Based on the first configuration, the charger may operate with an external power source such as an adaptor and the external power therefrom. For example, the charger may be utilized as one or a combination of a battery charger, a buck circuit, a system power source having the voltage level VSYS corresponding to the terminal VSYS (e.g. 3.4 Volts (V)), a flash LED driving circuit, a torch LED driving circuit, and another system power source having the voltage level VSYS2 corresponding to the terminal VSYS2 (e.g. the maximum of 3.8 V and the voltage level VBAT corresponding to the terminal VBAT, i.e. MAX (3.8 V, VBAT)). For brevity, similar descriptions for this embodiment are not repeated in detail here.

Figure 8:
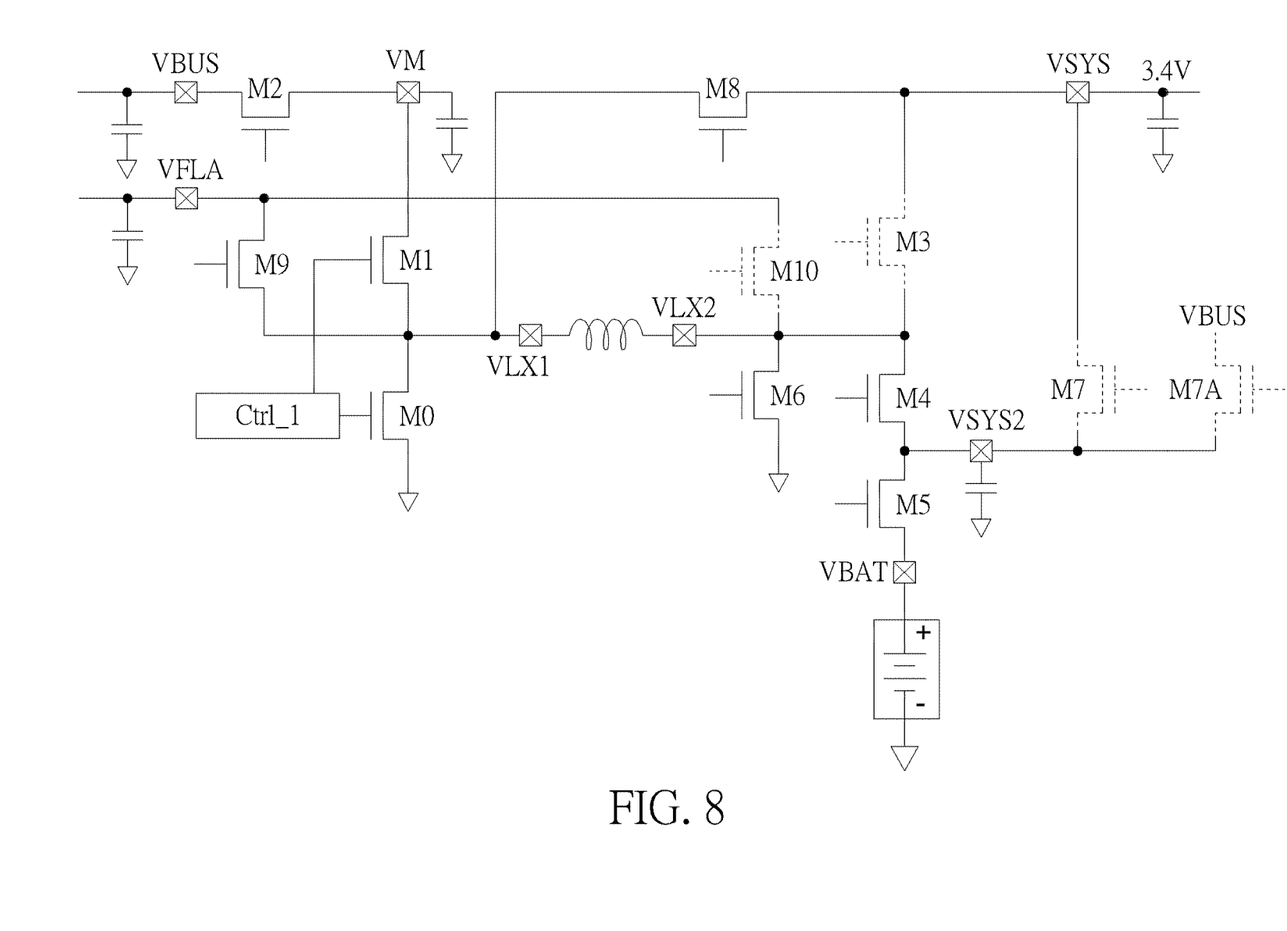
FIG. 8 illustrates a second configuration of the apparatus shown in FIG. 6 according to an embodiment of the present invention.

FIG. 8 illustrates a second configuration of the apparatus shown in FIG. 6 according to an embodiment of the present invention, where the switching circuits that are illustrated with dashed lines (e.g. the switching circuits M3, M7, M7A, and M10) may be temporarily turned off. Based on the second configuration, the charger may operate without the external power source such as the adaptor and the external power mentioned above. For example, the charger may be utilized as one or a combination of a boost circuit, a reverse boost circuit (e.g. in a situation where the electronic device is designed to comply with USB OTG specifications), a system power source having the voltage level VSYS corresponding to the terminal VSYS (e.g. 3.4 V), a flash LED driving circuit, a torch LED driving circuit, and another system power source having the voltage level VSYS2 corresponding to the terminal VSYS2 (e.g. the voltage level VBAT corresponding to the terminal VBAT). For brevity, similar descriptions for this embodiment are not repeated in detail here.

Figure 9:
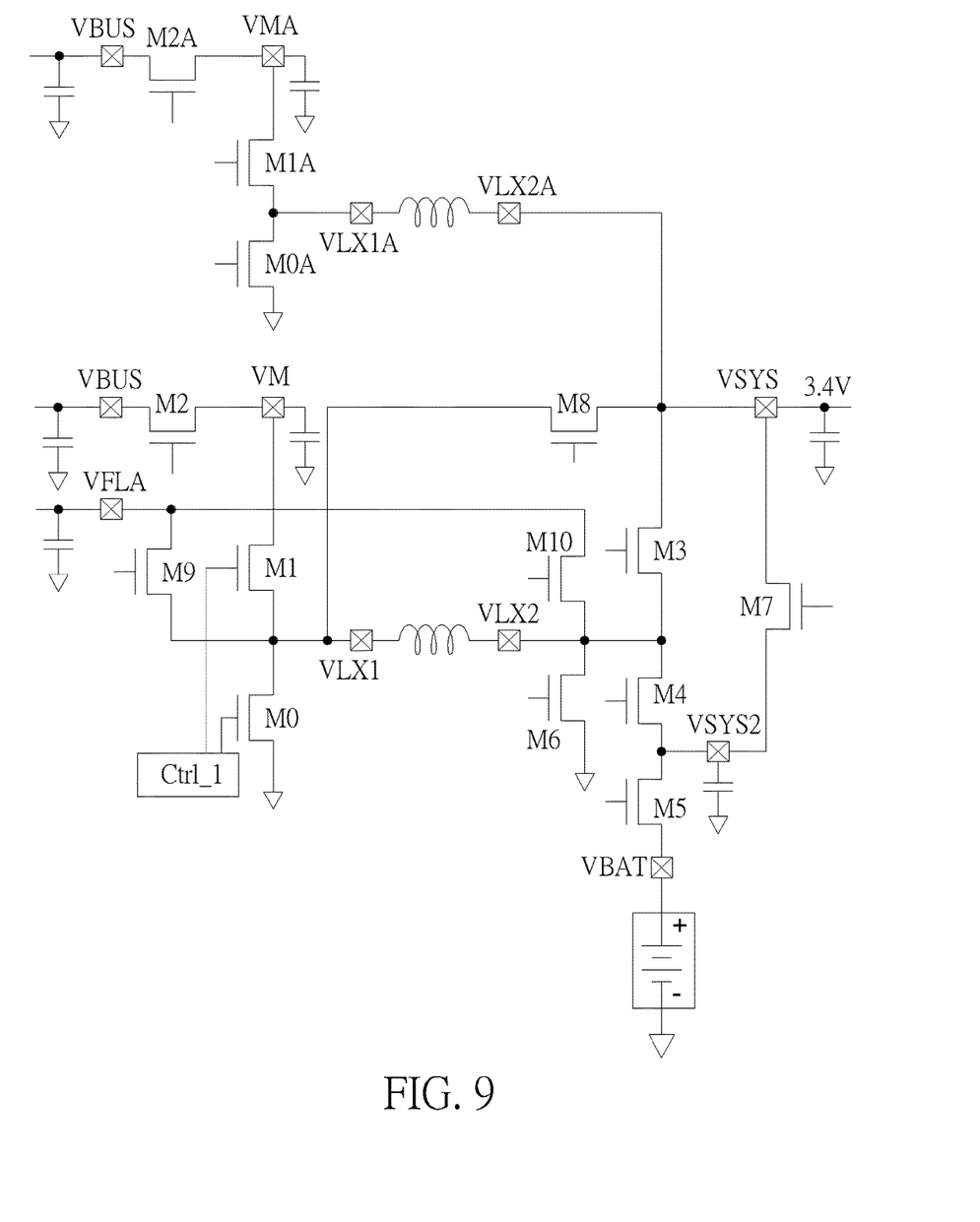
FIG. 9 is a diagram of an apparatus for performing hybrid power control in an electronic device according to another embodiment of the present invention.

FIG. 9 is a diagram of an apparatus for performing hybrid power control in an electronic device according to another embodiment of the present invention, where the terminals {VBUS} may be regarded as power input terminals, and the terminals VSYS, VSYS2, and VFLA may be regarded as power output terminals. In comparison with the apparatus shown in FIG. 6, an additional set of components and the associated wirings may be added in this embodiment. For example, the plurality of switching units of the embodiment shown in FIG. 9 may comprise the switching units M0, M1, M2, M3, M4, M5, M6, M7, M8, M9, and M10 shown around the lower half of FIG. 9, and may further comprise the switching units M0A, M1A, M2A shown around the upper half of FIG. 9. For example, the additional set of components and the associated wirings shown around the upper half of FIG. 9 may be implemented as a copy of the corresponding partial circuits shown around the lower half of FIG. 9. The additional set of components and the associated wirings in this embodiment allow higher charging current from one or more external power sources, for example, during charging. For brevity, similar descriptions for this embodiment are not repeated in detail here.

According to some embodiments, the architecture shown in FIG. 9 may vary, and more particularly, may have at least two additional sets (e.g. two or more additional sets) of components and the associated wirings, such as at least two copies of the aforementioned additional set of components and the associated wirings in the embodiment shown in FIG. 9. The aforementioned at least two additional sets of components and the associated wirings in these embodiments allow higher charging current from one or more external power sources, for example, during charging. For brevity, similar descriptions for these embodiments are not repeated in detail here.

Figure 10:
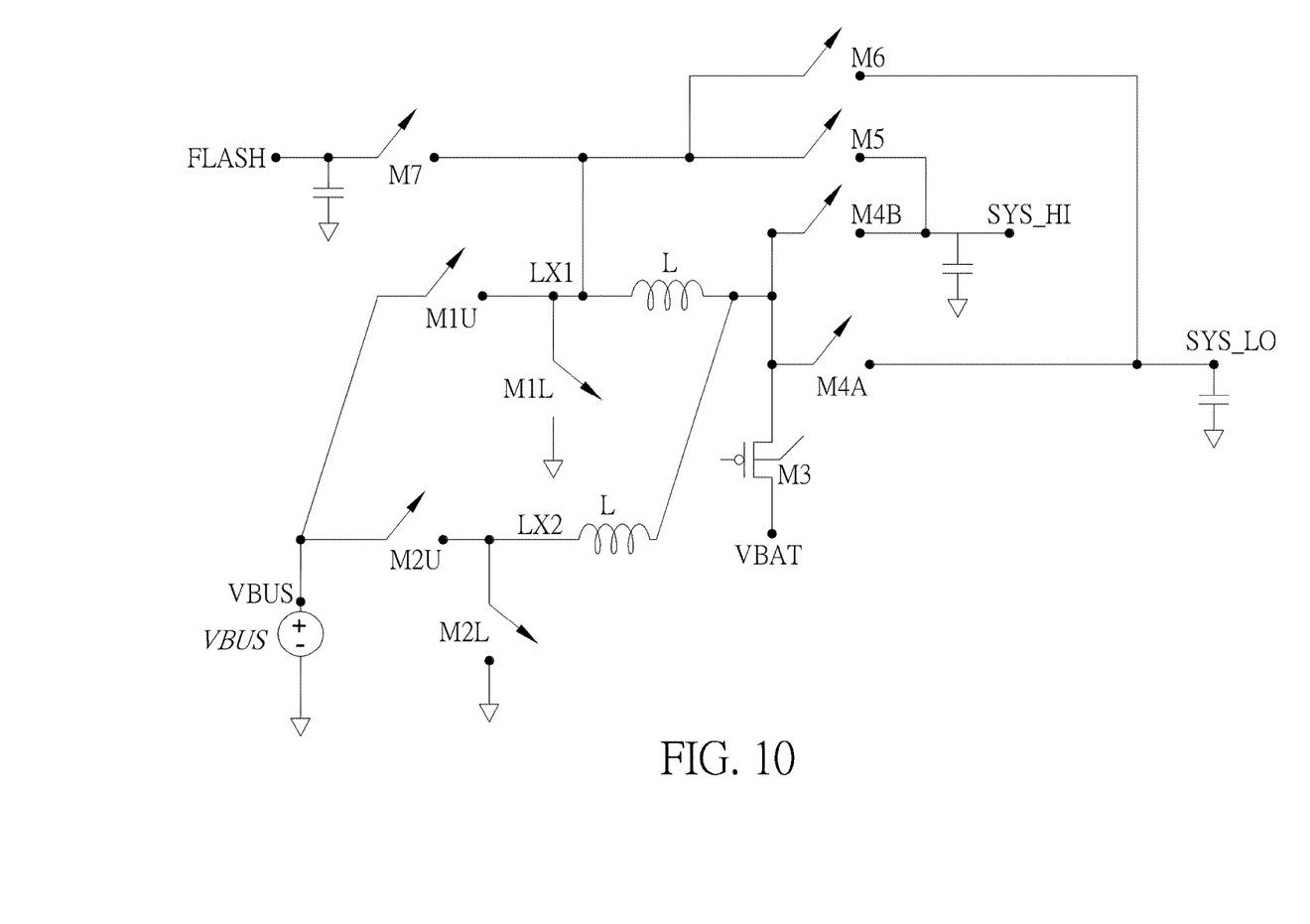
FIG. 10 is a diagram of an apparatus for performing hybrid power control in an electronic device according to another embodiment of the present invention.

FIG. 10 is a diagram of an apparatus for performing hybrid power control in an electronic device according to another embodiment of the present invention, where the terminal VBUS may be regarded as a power input terminal, and the terminals SYS_LO, SYS_HI, and Flash may be regarded as power output terminals. In comparison with the apparatus shown in FIG. 1, some components and the associated wirings are changed in this embodiment. For example, the plurality of switching units of the embodiment shown in FIG. 10 may comprise the switching units M1L, M1U, M2L, M2U, M3, M4A, M4B, M5, M6, and M7. For brevity, similar descriptions for this embodiment are not repeated in detail here.

According to some embodiments, the plurality of switching units in the apparatus of any of the embodiments described above may be implemented with MOSFETs. When a MOSFET of these MOSFETs is not electrically connected to the aforementioned at least one ground terminal, directly, this MOSFET can be a p-type MOSFET (PMOSFET) or a n-type MOSFET (NMOSFET). For brevity, similar descriptions for these embodiments are not repeated in detail here.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. An apparatus for performing hybrid power control in an electronic device, the apparatus comprising:
a charger, positioned in the electronic device, arranged for selectively charging a battery of the electronic device, wherein at least one portion of the charger is implemented within a charger chip, and the charger comprises:
a first terminal, positioned on the charger chip, arranged for coupling the charger to a power input port of the electronic device, wherein the power input port is utilized for selectively obtaining external power from outside the electronic device;
a second terminal, positioned on the charger chip, arranged for delivering the external power obtained through the first terminal to at least one internal component of the charger chip when needed;
a third terminal, positioned on the charger chip and selectively coupled to the second terminal, arranged for installing an inductor of the charger, wherein a first terminal of the inductor is coupled to the third terminal;
a fourth terminal, positioned on the charger chip, arranged for installing the inductor, wherein a second terminal of the inductor is coupled to the fourth terminal;
a plurality of switching units, positioned on the charger chip, arranged for selectively enabling or disabling partial paths between components within the charger, wherein the plurality of switching units comprises a first switching unit coupled between the second terminal and the third terminal; and
a control circuit, positioned on the charger chip and coupled to the plurality of switching units, arranged for controlling the plurality of switching units to configure the charger into one of a plurality of hardware configurations corresponding to multi-purpose usage of the charger, wherein the inductor is utilized by the charger when the control circuit configures the charger into any of at least two hardware configurations within the plurality of hardware configurations;
wherein the inductor is not kept idle when the control circuit configures the charger into any of the at least two hardware configurations.

2. The apparatus of claim 1, wherein the plurality of switching units further comprises another switching unit coupled between the third terminal and at least one ground terminal.

3. The apparatus of claim 1, wherein the plurality of switching units further comprises a second switching unit coupled between the first terminal and the second terminal.

4. The apparatus of claim 1, wherein each hardware configuration within the plurality of hardware configurations allows the charger to operate for at least one purpose within a plurality of purposes respectively corresponding to the plurality of hardware configurations.

5. The apparatus of claim 4, wherein a first hardware configuration within the plurality of hardware configurations allows the charger to provide a first voltage level for a first purpose of the plurality of purposes, and a second hardware configuration within the plurality of hardware configurations allows the charger to provide a second voltage level for a second purpose of the plurality of purposes.

6. The apparatus of claim 1, wherein the fourth terminal is arranged for interconnecting a battery path from the battery and another partial path within the charger; and the charger further comprises:
a battery terminal, positioned on the charger chip and selectively coupled to the fourth terminal, arranged for coupling the battery to the charger;
wherein the plurality of switching units further comprises another switching unit coupled between the fourth terminal and the battery terminal.

7. The apparatus of claim 6, wherein the charger further comprises:
a first power output path, coupled between the fourth terminal and a first output terminal of the charger, arranged for providing a first voltage level; and
a second power output path, coupled to the third terminal and a second output terminal of the charger, arranged for selectively providing a second voltage level, wherein the second voltage level is greater than the first voltage level;
wherein the plurality of switching units further comprises yet another switching unit coupled between the fourth terminal and the first output terminal of the charger, and further comprises at least one other switching unit coupled between the third terminal and the second output terminal of the charger.

8. The apparatus of claim 7, wherein one of other switching units within the plurality of switching units is coupled between the fourth terminal and the first output terminal of the charger, and another of the other switching units within the plurality of switching units is coupled between the battery terminal and the first output terminal of the charger.

9. The apparatus of claim 8, wherein yet another of the other switching units within the plurality of switching units is coupled between the fourth terminal and at least one ground terminal.

10. The apparatus of claim 8, wherein yet another of the other switching units within the plurality of switching units is coupled between the first output terminal and the second output terminal of the charger.

11. The apparatus of claim 7, wherein one of other switching units within the plurality of switching units is coupled between the third terminal and the first output terminal of the charger, and another of the other switching units within the plurality of switching units is coupled between the fourth terminal and the second output terminal of the charger; and the charger further comprises:
a third power output path, coupled to the third terminal and a third output terminal of the charger, arranged for selectively providing a third voltage level, wherein the third voltage level is greater than the first voltage level;
wherein yet another of the other switching units within the plurality of switching units is coupled between the third terminal and the third output terminal of the charger.

12. The apparatus of claim 11, wherein the second power output path and the third power output path correspond to different hardware configurations within the plurality of hardware configurations.

13. The apparatus of claim 11, wherein the charger further comprises:
  another third terminal, positioned on the charger chip and selectively coupled to the second terminal, arranged for installing another inductor of the charger, wherein a first terminal of the other inductor is coupled to the other third terminal, and a second terminal of the other inductor is coupled to the fourth terminal;
  wherein the plurality of switching units comprises another first switching unit coupled between the second terminal and the other third terminal.

14. The apparatus of claim 1, wherein the charger further comprises:
  a fifth terminal, positioned on the charger chip and selectively coupled to the fourth terminal, arranged for interconnecting a battery path from the battery and another partial path within the charger; and
  a battery terminal, positioned on the charger chip and selectively coupled to the fifth terminal, arranged for coupling the battery to the charger;
  wherein the plurality of switching units further comprises another switching unit coupled between the fifth terminal and the battery terminal.

15. The apparatus of claim 1, wherein the charger further comprises:
  a first power output path, coupled between the fourth terminal and a first output terminal of the charger, arranged for providing a first voltage level; and
  a second power output path, coupled to the third terminal and a second output terminal of the charger, arranged for selectively providing a second voltage level, wherein the second voltage level is greater than the first voltage level;
  wherein the plurality of switching units further comprises at least one other switching unit coupled between the third terminal and the second output terminal of the charger.

16. The apparatus of claim 15, wherein the charger further comprises:
  a third power output path, coupled to the third terminal and a third output terminal of the charger, arranged for selectively providing a third voltage level, wherein the third voltage level is different from the first voltage level and is different from the second voltage level;
  wherein the plurality of switching units further comprises another switching unit coupled between the third terminal and the third output terminal of the charger.

17. The apparatus of claim 15, wherein the charger further comprises:
  a third power output path, coupled to the four terminal and a third output terminal of the charger, arranged for selectively providing a third voltage level, wherein the third voltage level is different from the first voltage level and is different from the second voltage level;
  wherein the plurality of switching units further comprises another switching unit coupled between the four terminal and the third output terminal of the charger.

18. The apparatus of claim 17, wherein the charger further comprises:
  a battery terminal, positioned on the charger chip and selectively coupled to the third output terminal of the charger, arranged for coupling the battery to the charger;
  wherein the plurality of switching units further comprises yet another switching unit coupled between the battery terminal and the third output terminal of the charger.

19. The apparatus of claim 18, wherein one of other switching units within the plurality of switching units is coupled between the fourth terminal and the first output terminal of the charger, and another of the other switching units within the plurality of switching units is coupled between the first output terminal and the second output terminal of the charger.

20. An apparatus for performing hybrid power control in an electronic device, the apparatus comprising:
  a charger, positioned in the electronic device, arranged for selectively charging a battery of the electronic device, wherein at least one portion of the charger is implemented within a charger chip, and the charger comprises:
    a first terminal, positioned on the charger chip, arranged for coupling the charger to a power input port of the electronic device, wherein the power input port is utilized for selectively obtaining external power from outside the electronic device;
    a second terminal, positioned on the charger chip, arranged for delivering the external power obtained through the first terminal to at least one internal component of the charger chip when needed;
    a third terminal, positioned on the charger chip and selectively coupled to the second terminal, arranged for installing an inductor of the charger, wherein a first terminal of the inductor is coupled to the third terminal;
    a fourth terminal, positioned on the charger chip, arranged for installing the inductor, wherein a second terminal of the inductor is coupled to the fourth terminal;
    a plurality of switching units, positioned on the charger chip, arranged for selectively enabling or disabling partial paths between components within the charger, wherein the plurality of switching units comprises a first switching unit coupled between the second terminal and the third terminal; and
    a control circuit, positioned on the charger chip and coupled to the plurality of switching units, arranged for controlling the plurality of switching units to configure the charger into one of a plurality of hardware configurations corresponding to multi-purpose usage of the charger, wherein the inductor is utilized by the charger when the control circuit configures the charger into any of at least two hardware configurations within the plurality of hardware configurations;
  wherein each hardware configuration within the plurality of hardware configurations allows the charger to operate for at least one purpose within a plurality of purposes respectively corresponding to the plurality of hardware configurations.

* * * * *